(No Model.)
W. T. RAY.
ATTACHMENT FOR CULTIVATORS.
No. 553,937. Patented Feb. 4, 1896.
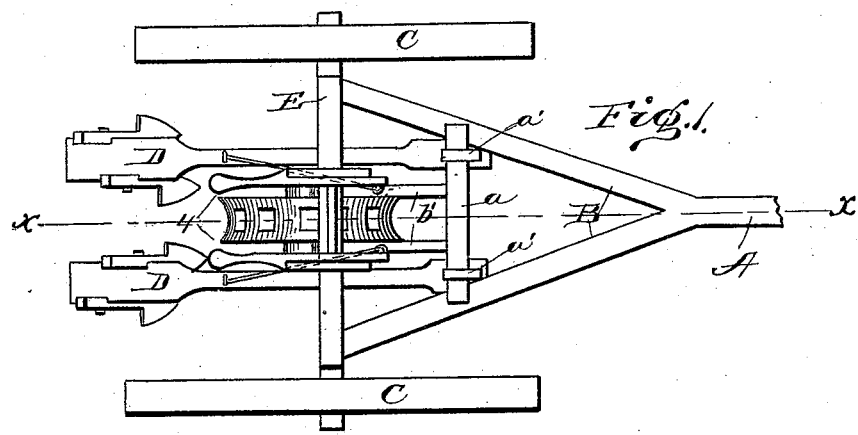
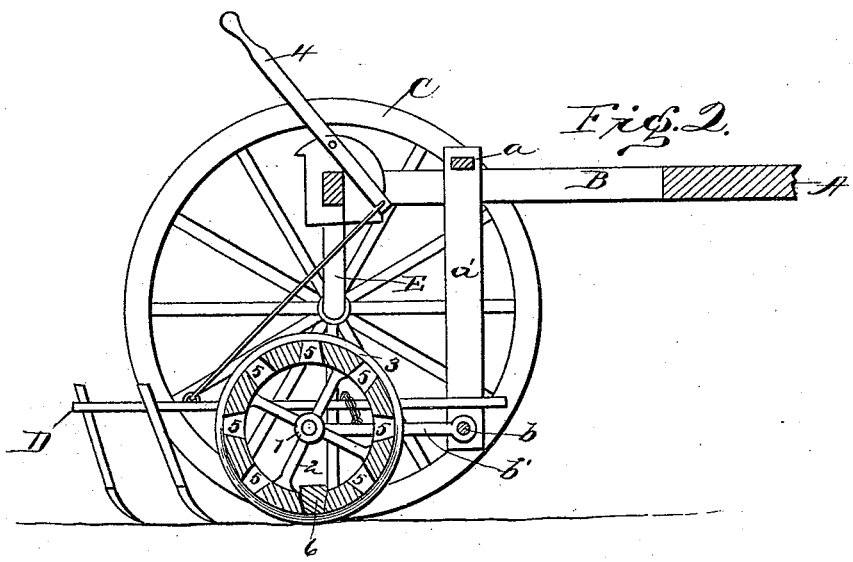
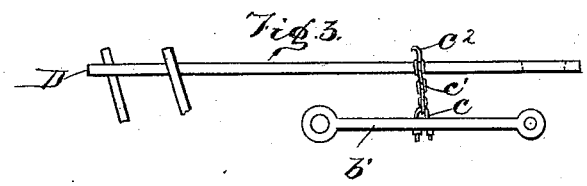
Witnesses:
J. M. Finley Jr.
R. E. Rabbitt.
Inventor:
W. T. Ray
By John S. Duffie
Attorney.

UNITED STATES PATENT OFFICE.

WILLIAM T. RAY, OF GEORGETOWN, TEXAS.

ATTACHMENT FOR CULTIVATORS.

SPECIFICATION forming part of Letters Patent No. 553,937, dated February 4, 1896.

Application filed July 3, 1895. Serial No. 554,792. (No model.)

*To all whom it may concern:*

Be it known that I, WILLIAM T. RAY, a citizen of the United States, residing at Georgetown, in the county of Williamson and State of Texas, have invented certain new and useful Improvements in Attachments for Cultivators; and I do hereby declare the following to be a full, clear, and exact description of the invention, such as will enable others skilled in the art to which it appertains to make and use the same.

My invention is a cotton-chopper attachment which is secured to a cultivator. In the accompanying drawings it is represented as being attached to "Avery's New South Cultivator," but it may be attached to other cultivators if so constructed that the attachment can be made without too great a change.

My invention consists of a wheel so constructed that it rides upon the row and presses down into the ground parts of the cotton in the row, leaving the other standing, and of the necessary mechanism for attaching and controlling said wheel.

In the accompanying drawings, Figure 1 is a top plan view of the "New South Cultivator" with my invention attached thereto. Fig. 2 is a vertical longitudinal sectional view of Fig. 1 on the line $x\ x$. Fig. 3 is a detail view.

My invention is described as follows:

A, B, C, D and E represent the tongue, hounds, wheels, plow-beams and axle of the cultivator. Over the top of the hounds B is secured a cross-beam $a$, to which is suspended two pendants $a'$. The lower ends of these pendants are slipped through mortise-holes in the front ends of the plow-standards. In the lower ends of said pendants and below the front end of the plow-standards D is a bolt $b$, on which is pivoted the front ends of bearings $b'$. Between the rear end of said bearings is journaled my "chopper-wheel," as I shall term it. This wheel is made of heavy material. I prefer that it be cast of iron. It consists of the central hub 1, spokes 2, heavy rim 3 and flanges 4. These flanges are formed by hollowing out the periphery of the wheel. This particular shape of the periphery is for the purpose of causing the wheel to more truly follow the top of the row and for the purpose of giving the top of the row a rounded form, thus enabling the dirt to be thrown in on the depressed cotton with less liability of covering up the stalks that are left standing.

The wheel has in its periphery openings 5. These openings go entirely through the rim and are a little larger on the inside than the outside, so that the dirt will not pack therein. These openings are usually about nine inches apart, so that when it goes over the row it leaves a stand of cotton about nine inches apart. This wheel is also provided with plugs 6 for this reason: When I wish the cotton to be left a considerable distance apart, say eighteen inches, I put a plug in each alternate opening. I do not confine myself to a wheel, however, of any particular size, or a wheel having any particular number of openings in it, as I may manufacture the wheel, some with openings far apart and some with openings not so far apart.

The bearings $b'$ are provided with U-staples $c$ and chain $c'$, and the plow-standards are provided with hooks $c^2$, so that the wheel may be geared higher or lower in relation to the plow-standards, so that it may be regulated whether the ridges be high or low in relation to the furrows between.

Having described my invention, what I claim as new, and desire to secure by Letters Patent, is—

1. In combination with a cultivator, substantially as shown and described, bolt $b$, passing through the lower ends of the pendants $a'$; bearings $b'$, their front ends pivoted on the bolt $b$, their rear ends having journaled between them a cotton-chopper wheel, having the central hub 1, spokes 2, rim 3, flanges 4, openings 5, substantially as shown and described and for the purposes set forth.

2. In combination with a cultivator, substantially as shown and described, bolt $b$, passing through the lower ends of the pendants $a'$; bearings $b'$, their front ends pivoted on the bolt $b$, their rear ends having journaled between them a cotton-chopper wheel, having the central hub 1, spokes 2, rim 3, flanges 4, openings 5; plugs 6, adapted to fill one or more of said openings 5; U-staples $c$, secured in said bearings; chains $c'$, their lower ends secured to the staples $c$, their upper ends to the hooks $c^2$, substantially as shown and described and for the purposes set forth.

In testimony whereof I affix my signature in presence of two witnesses.

WILLIAM T. RAY.

Witnesses:
JAS. E. BYROM,
JNO. M. ELLYSON.